(12) United States Patent
Sauvignet et al.

(10) Patent No.: US 11,878,923 B2
(45) Date of Patent: Jan. 23, 2024

(54) SYSTEM FOR THE BIOLOGICAL TREATMENT OF WATER AND CORRESPONDING METHOD

(71) Applicant: Veolia Water Solutions & Technologies Support, Saint-Maurice (FR)

(72) Inventors: Philippe Sauvignet, Saint Etienne en Cogles (FR); Nicolas Meudal, Lucerne (CH); Nikolai Hertfleder, Kirchberg and des Jagst (DE); Goulven Inial, Aix les Bains (FR); Sophie Lindegaard, Saint Maur des Fosses (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 518 days.

(21) Appl. No.: 16/766,309

(22) PCT Filed: Oct. 23, 2018

(86) PCT No.: PCT/EP2018/078951
§ 371 (c)(1),
(2) Date: May 22, 2020

(87) PCT Pub. No.: WO2019/101454
PCT Pub. Date: May 31, 2019

(65) Prior Publication Data
US 2020/0369544 A1 Nov. 26, 2020

(30) Foreign Application Priority Data

Nov. 23, 2017 (FR) ...................................... 1761119

(51) Int. Cl.
C02F 3/08 (2023.01)
C02F 3/10 (2023.01)
C02F 3/00 (2023.01)

(52) U.S. Cl.
CPC .............. *C02F 3/085* (2013.01); *C02F 3/082* (2013.01); *C02F 3/104* (2013.01); *C02F 2003/001* (2013.01); *C02F 2203/006* (2013.01)

(58) Field of Classification Search
CPC .......... C02F 3/082; C02F 3/085; C02F 3/104; C02F 2209/42; C02F 3/18; C02F 7/00
(Continued)

(56) References Cited

U.S. PATENT DOCUMENTS 4,028,244 A * 6/1977 Holmberg ............... C02F 3/082
210/150

FOREIGN PATENT DOCUMENTS

DE 102008007530 A1 * 8/2009 ............. C02F 3/082
FR 784706 7/1935
(Continued)

OTHER PUBLICATIONS

Rauch, DE 102008007530, English machine translation, pp. 1-3 (Year: 2009).*

*Primary Examiner* — Claire A Norris
(74) *Attorney, Agent, or Firm* — COATS & BENNETT, PLLC

(57) ABSTRACT

A system for biologically treating wastewater comprising a rotating drum disposed within a tank. Biofilm carriers are contained in the drum. One or more hollow tube aerators are secured inside the drum to a perforated wall that forms a part of the drum. As the drum is rotated within the tank, the mixing of the biofilm carriers with the wastewater therein and the action of the hollow tubes aerates the wastewater in the rotating drum.

13 Claims, 3 Drawing Sheets

(58) Field of Classification Search
USPC .................................................. 210/150, 619
See application file for complete search history.

(56) References Cited

FOREIGN PATENT DOCUMENTS

| | | |
|---|---|---|
| GB | 508881 | 7/1939 |
| WO | 8605770 | 10/1986 |
| WO | WO8605770 A1 * | 10/1988 |

\* cited by examiner

SYSTEM FOR THE BIOLOGICAL TREATMENT OF WATER AND CORRESPONDING METHOD

1. FIELD OF THE INVENTION

The field of the invention is that of the biological treatment of water, especially with a view to purifying it and making it potable.

More specifically, the invention relates to a system of biological treatment of water by biomass fixed on carriers.

2. PRIOR ART

There are numerous types of biological treatment of wastewater using biomass fixed on media. Unlike activated sludges in which the biomass can develop freely in the water to be treated, the biomass fixed on media colonizes the media introduced into the water to be treated in order to form a biological film or biofilm. The fixing of the biomass as a biofilm diminishes the size of the biological reactor or reactors.

There is a method especially known in the prior art called the moving bed biofilm reactor (generally known by its acronym MBBR) method. A conventional MBBR reactor consists of a reactor filled with free media kept in motion by fluidization. A screen having a mesh finer than the size of the free media is disposed at the exit from the reactor in order to retain these free media within the reactor. The MBBR reactor is used especially to provide for the treatment of carbon and the nitrification of wastewater by the injection of a large quantity of air. This injection of air enables the aeration of the water in order to obtain an aerobic biological treatment as well as the fluidization of the media bed. The MBBR method can be used to process a large quantity of water because of the large available surface area offered by the free media and is used, to date, chiefly in large-sized wastewater treatment plants. However, it has certain disadvantages: the continuous injection of air into the reactor elevates the operating cost of the method; in addition, the cleaning and maintenance of the aeration nozzles is a painstaking task, since these nozzles are difficult to access.

There is also a method known in the prior art called the rotating biological contactor method also known by the acronym RBC. A conventional RBC reactor consists of a series of disks mounted in parallel on a horizontal central shaft and placed in a tank containing water to be treated so as to be partially submerged. The disks are generally submerged to about 40% of their total surface area and put into rotation about the horizontal central shaft. Thus, the disks constitute a medium or carrier on which the biofilm can grow. During the rotation of the disk, the carrier is alternately submerged in the water to be treated and then exposed to the ambient air. This makes it possible to obtain an aerobic biological treatment, especially treatment of carbon and nitrification without injection of air into the water to be treated. However, the RBC method has several disadvantages: firstly, the oxygenation capacity of the biomass in this method is moderate and constitutes a factor that limits the development of the biomass. Secondly, the use of the medium or carrier is not optimal since only the small part of it (less than 40%) is submerged and never the totality. Thirdly, the biomass develops heterogeneously on the surface of the medium: the biomass develops and gets accumulated all the more efficiently in the parts closest to the horizontal shaft as it is subjected to a lower radial speed. An imbalance in the distribution of the load on the disks implies the use of high-powered motors. Fourthly, the RBC method produces large quantities, intermittently, of suspended solid matter at the exit from the installation owing to the detachment of the part of the biofilm. More generally, the rotating biological contactors allow for the treatment of smaller volumes of water because of a relatively large space requirement of the installation. In addition, their processing efficiency is often random and unforeseeable.

3. GOALS OF THE INVENTION

The present invention is aimed at proposing a system for the biological treatment of water by biomass fixed on media that overcomes at least some of the drawbacks of the prior art mentioned here above.

In particular, it is a goal of the invention to provide a system for the biological treatment of water that can efficiently treat large volumes of water at moderate cost.

It is another object of the invention to provide a system for the biological treatment of water that is robust and requires little maintenance.

It is another goal of the invention, in at least certain embodiments, to provide a system for the biological treatment of water that enables an efficient aeration of the water to be treated.

It is another goal of the invention to propose a method of biological treatment of water using said system of treatment according to the present invention.

4. SUMMARY OF THE INVENTION

These different goals are attained by means of the invention which relates to a system for the biological treatment of wastewater comprising:
- a tank comprising a point for the entry of water to be treated and a point for the exit of treated water,
- a rotating drum defining an internal volume, said drum being capable of rotating about a horizontal shaft and having a wall that is at least partly permeable to water, the rotating drum being disposed in the tank and being intended for being partially submerged in the water contained in the tank, less than half of its internal volume bathing in the water contained in the tank,
- a driving means intended for driving the rotating drum in rotation about the horizontal shaft and,
- free media, having a surface suited to the development of a biofilm, disposed within the rotating drum and retained by the wall of the rotating drum, the free media occupying a volume ranging from 30% to 80% of the internal volume of the rotating drum;
- at least one hollow tube extending in parallel to said horizontal shaft fixed to said wall of said rotating drum within said rotating drum, said at least one hollow tube having a perforated longitudinal section comprising a set of orifices distributed homogeneously throughout the length of said at least one hollow tube, said at least one hollow tube being designed to get filled alternately with water and with air when said rotating drum, partially submerged in the water contained in the tank, is put into rotation in a given sense.

Since the free media occupy 30% to 80% of this volume, the rotation of the drum results in these media being sometimes above water and sometimes submerged.

Thus, the inventors of the present invention have, in an original manner, combined certain of the technical characteristics of the MBBR reactors, especially the use of free media thus offering a large available surface of media for the development of a biofilm with certain characteristics of the rotating biological contactors, especially the characteristic of making the media rotate. Because the rotating drum is put into rotation, the media can be driven by a continuous motion within the rotating drum. A homogeneous growth of the biomass on the free media is possible through a drop effect. As compared to an MBBR reactor which requires intense aeration for the fluidizing of the free media, putting the free media into rotation in the rotating drum makes it possible to approach the ideal conditions of a set of free media infinitely mixed in a perfectly stirred reactor, while at the same time doing away with the need for dedicated aeration. As compared with a rotating biological contactor, putting the free media into rotation in the rotating drum provides for homogeneous growth on the media and a gradual detachment of dead biofilm, thus ensuring a content of suspended solid matter in the treated water that has little variation.

The fill level of free media in the rotating drum corresponds to the ratio of the volume occupied by the loose free media to the internal volume of the rotating drum. A free media fill level of less than 30% is not desirable because this would lead to unjustifiably excessive space requirement for the installation relative to its capacities of biological treatment and/or lead to low efficiency of the biological treatment because of the small surface area offered by the free media for the development of a biofilm. Besides, a free media fill level of over 80% is not more desirable. The fact is that this would prevent an efficient mixing of the free media within the rotating drum, prevent the detachment of the biofilm by friction of the free media with one another and act against the efficient aeration of the reactor (unless it is planned to have aeration in addition to that allowed by the perforated tubes).

The tank used can be of the same type as the one already used in RBC methods. In particular, a rotating biological contactor can easily be converted into a system according to the present invention by replacing the disks with the rotating drum filled with free media up to 30% to 80% by volume. The tank includes an entry point for water to be treated and an exit point for treated water. The entry point for water to be treated and the exit point for treated water are advantageously situated at two opposite extremities of the tank. The tank optionally comprises a spout placed at a given height of the tank making it possible to set a maximum level for water in the tank.

The rotating drum is capable of rotating about a horizontal shaft. Its wall is formed by a hollow cylinder closed by two disks at its extremities. It is at least partly permeable to water, i.e. it can be traversed by the water contained in the tank in at least certain sections. It is also capable of retaining all the free media within the rotating drum. A rotating drum is disposed in the tank and is intended to be partially submerged in the water contained in the tank.

Advantageously, the hollow cylinder wall of the rotating drum is formed by a screen element or a perforated metal sheet, of which the mesh or size of the orifices is small enough to enable retention of the totality of the free media within the rotating drum. This makes it possible especially to lighten the weight of the rotating drum and ensure an efficient circulation of water between the interior and the exterior of the rotating drum.

It will be noted that the drum can be also divided into at least into two compartments to ensure improved rigidity of the screen or of the perforated metal sheet.

The rotating drum can be put into rotation about the horizontal shaft through a driving means. This driving means comprises especially a motor and a driving shaft fixed to said rotating drum along a horizontal shaft.

The free media are disposed within the rotating drum and held back by the wall of the rotating drum. In addition, they occupy a volume of 30% to 80% of the internal volume of the rotating drum. This range of values ensures sufficient biological treatment capacity and, at the same time, efficient mixing of the free media within the rotating drum while contributing to efficient aeration.

The free media have a surface suited to the development of a biofilm. They can especially be made out of a material belonging to the group constituted by high-density polyethylene (HDPE) or polypropylene with or without additives such as for example lime.

The free media have an adapted form enabling the development of a biofilm on a large surface area of the media but for a small volume of the media. This has the advantage especially of providing a surface for the media up to four times greater than the surface of a rotating biological contactor having a same space requirement. The surface of the free media can especially be divided into an external surface, confronted by the abrasion forces linked to the impacts of the free media with one another, and a protected surface (a surface complementary to the external surface). The specific surface area of the free media is then defined as being the ratio of the protected surface area of a free carrier to the volume of the free carrier and is expressed in $m^2/m^3$. The free media preferably have a specific surface area greater than 200 $m^2/m^3$, advantageously ranging from 200 to 1300 $m^2/m^3$.

According to one particular embodiment, the free media are media made of plastic capable of being used in an MBBR method such as for example media commercially distributed by the firm AnoxKaldnes under the trade names K1, K3, K5, F3. They can also be constituted by media or media of natural organic origin or natural mineral origin such as: pieces of pumice stone, expanded clay beads, sludge granulates, granular activated carbon, polystyrene beads, pieces of cork, etc.

According to a preferred characteristic of the invention, the system according to the invention comprises means of aeration of the water contained in the tank. This enables biological treatment to be carried out in aerobic conditions.

According to the invention, the aeration means comprise at least one hollow tube extending in parallel to the horizontal shaft and fixed to the wall of the rotating drum within the rotating drum. The hollow tube has orifices throughout its length. These orifices have a size smaller than that of the free media so that these free media cannot re-enter the interior of said hollow tube.

When the rotating drum, which is partially submerged in the water contained in the tank, is put into rotation in a given sense, the perforated hollow tube gets filled alternately with water and with air. More specifically, when the perforated hollow tube is above water, it gets drained of water and filled with air. On the contrary, when the perforated hollow tube gets submerged, it gets emptied of air and filled with water. This therefore enables an aeration of the water within the tube at low cost in advantageously using the energy of the driving means. In addition, such a driving means implies only only very simple operations of maintenance as compared to the maintenance that has to be carried out on the aeration nozzles of conventional MBBR reactors. Preferably, the system does not comprise other aeration means.

The number of orifices, the size of the orifices and the total surface area and the distribution of the orifices can be adapted according to the desired aeration and the type of media. The "perforation proportion" corresponding to the surface area of the tube occupied by the orifices in relation to the total external surface area of the tube preferably ranges from 2% to 6%.

The tubes could especially have a circular or square cross-section. The orifices for their part could especially be circular or oblong.

Preferably, the perforated longitudinal section of the hollow tube comprises a set of orifices distributed homogenously throughout the length of the hollow tube.

Advantageously, the perorated longitudinal section is oriented radially in such a way that the hollow tube is capable of getting emptied of air when it is most submerged under the water contained in the tank. This ensures greater efficiency of aeration. Such a radial orientation can especially be obtained by placing the orifices of the perforated hollow tube frontwards in the rotational sense of the rotating drum, possibly rotated by a few degrees towards the horizontal shaft.

Preferably, the system comprises at least two identical perforated hollow tubes. The at least two hollow tubes are advantageously disposed in the rotating drum so as to be diametrically opposite or, as the case may be, in a regular polygonal configuration. This gives a homogeneous distribution of loads in the rotating drum. Advantageously, the system comprises four to six identical perforated hollow tubes.

According to another preferred characteristic of the invention, the system comprises means of airtightness against the external air which could, in practice, be distinct from watertightness means. This enables the application of the biological treatment operations in anoxic conditions.

According to one particular embodiment of the invention, these tight-sealing means comprise a housing surmounting the tank, and the entry point of the tank for water to be treated and the exit point of the tank for treated water are liquid siphons, thus making the tank completely airtight. These means can also include airtightness means planned at the extremities of the shaft of the drum, at its connection to the tank.

The present invention also relates to a method for the biological treatment of wastewater in a system as described here above. This method comprises:
  feeding the tank with water to be treated,
  putting into rotation the rotating drum, partially submerged in the water contained in the tank, and
  removing treated water from the tank.

Preferably, the rotation speed of said drum ranges from one to five rotations per minute.

5. LIST OF FIGURES

The invention as well as the different advantages that it presents shall be understood more clearly from the following description of a non-restrictive embodiment of a system and a method according to this invention, given with reference to the appended drawings, of which:

Figure 4:
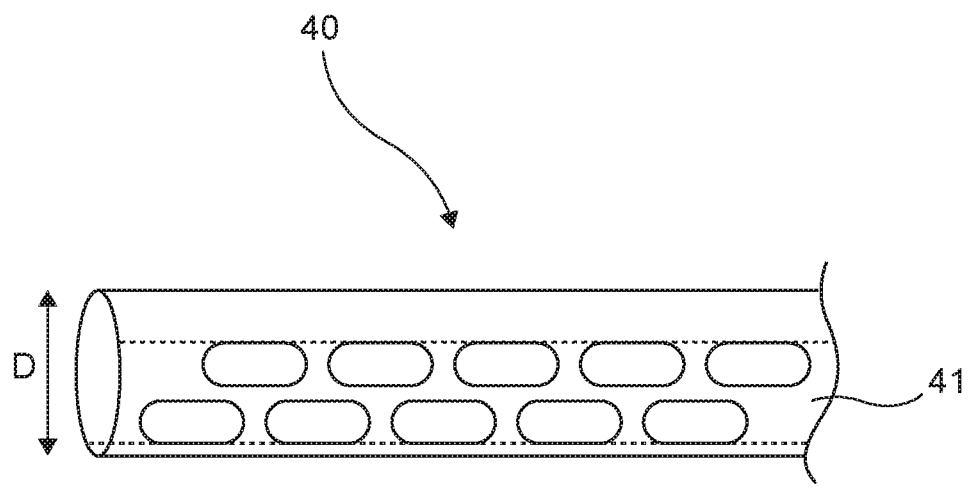

FIG. 4 partially represents an embodiment of a perforated hollow tube used in the context of this embodiment.

6. DETAILED DESCRIPTION OF ONE EMBODIMENT OF A SYSTEM ACCORDING TO THE INVENTION

Figure 1:
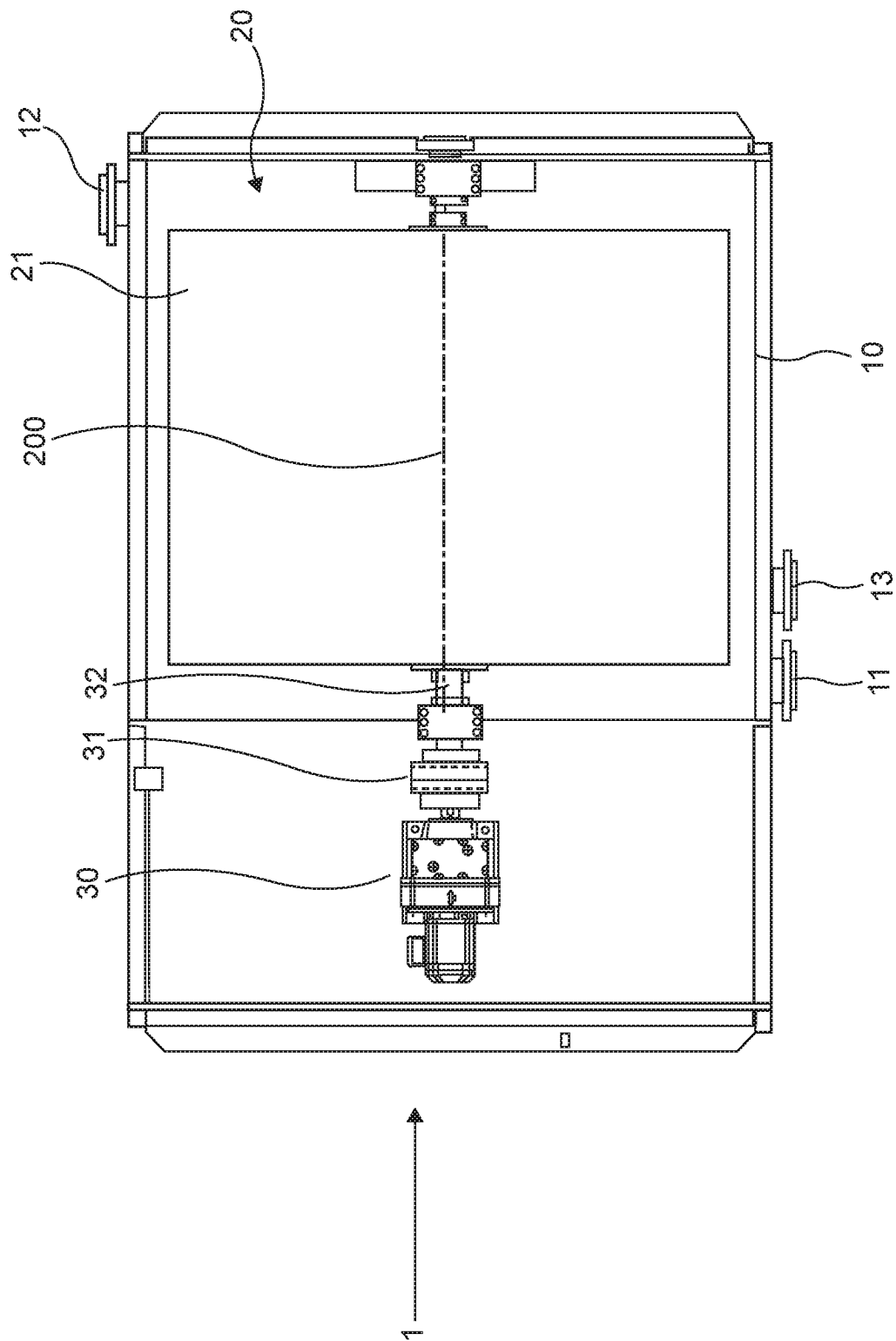
FIG. 1 is a top view of an embodiment of a system according to the invention.
Figure 2:
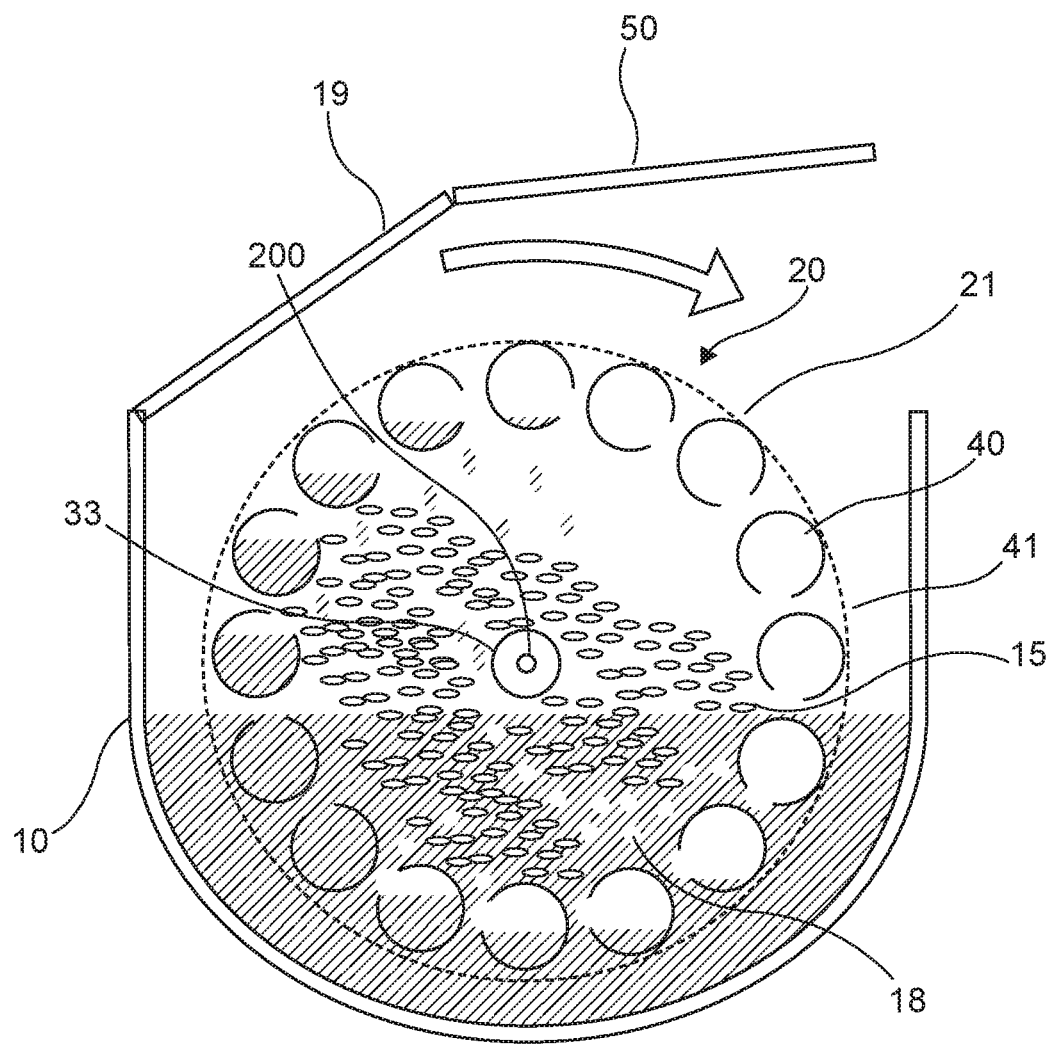
FIG. 2 is a front view, in section, of the tank and of the rotating drum of the system according to the invention.

Referring to FIGS. 1 and 2, the system comprises: a tank 10, a rotating drum 20, a driving means 30, 31, 32 enabling the rotating drum 20 to be driven in rotation, free media 15 disposed within the rotating drum 20 and an aeration means constituted by ten perforated hollow tubes 40.

The tank 10 is semi-cylindrical in shape and comprises an entry point 11 for water to be treated and an exit point 12 for treated water. The tank also comprises a spout 13 by which it is possible to avoid surpassing a maximum height of water in the tank.

The rotating drum 20 can rotate about a horizontal shaft 200 through a drive means formed by a motor-reduction gear 30, a transmission shaft 32, and an elastic coupling 31 for coupling between the motor-reduction gear 30 and the transmission shaft 32. The motor-reduction gear 30 can be a low-powered motor-reduction gear such as a for example a 1.5 kW motor-reduction gear.

The rotating drum 20 has a wall 21 constituted by a hollow cylinder closed by two disks at its extremities. The hollow cylinder wall of the rotating drum 20 is formed by a screen or a perforated metal sheet, the mesh of which is small enough to make it capable of retention of the totality of the free media 15 within the rotating drum 20. The size of the meshes of the drum is 15 mm in this embodiment.

The disks at the extremities of the hollow cylinder are fixed to the transmission shaft 32. The rotating drum 20 is therefore particularly light. Referring to FIG. 4, each of the ten perforated hollow tubes 40 has a diameter D of 110 mm and is provided with orifices that are distributed in two rows and placed in a quincunxial arrangement. More specifically, each tube has 24 orifices with a diameter of 2 cm, the orifices being separated from one another by a line between centers equal to about 3.5 cm. This distribution of orifices corresponds to a 6% piercing rate of the tubes.

Free media 15 are disposed within said rotating drum 20 and retained by said wall of the rotating drum 20. They occupy a volume corresponding to 67% of the internal volume of the rotating drum 20, i.e. approximately 3.4 m$^3$. This value ensures sufficient biological treatment capacity and, at the same time, efficient mixing of the free media within the rotating drum.

Figure 3:
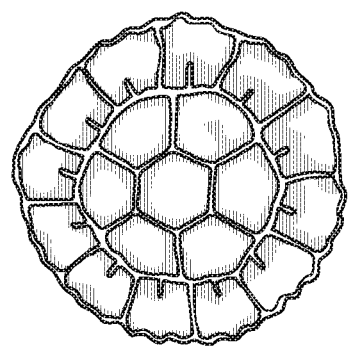
FIG. 3 is a free medium or carrier commercially distributed under the name K3 by the firm AnoxKaldnes.

Referring to FIG. 3, which shows a free medium or carrier commercially distributed under the trade name K3 by the firm AnoxKaldnes, the free media used have a suitable shape enabling the development of a biofilm on a large surface area of the media but a small volume of media. These elements have a diameter of 25 mm, a height of 10 mm and a protected surface area of 500 m2/m3

An aerobic type treatment necessitates an efficient treatment of the water contained in the rotating drum 20. This aeration is ensured by the perforated tubes 40 fixed to the interior of the wall 21 of the rotating drum 20 in parallel to the horizontal shaft 200. Since the hollow tubes 40 have a perforated longitudinal section 41, when the rotating drum 20 rotates, the hollow tubes 40 get filled alternately with water and with air, releasing air 18 into the water contained in the rotating drum 20, the media fall in cascade onto the surface of the water contained in the rotating drum 20. Thus, the aeration and the mixing in the rotating drum 20 are generated by the same motor-reduction gear 30 and require little energy.

The number of perforations as well as the surface area occupied by these perforations is optimized to ensure appropriate air transfer into the water contained in the rotating drum 20.

The orientation of the perforated tubes 40 is optimized so that the hollow tubes are emptied of air when they are most submerged under the water contained in the rotating drum 20.

In the event of the installation described being used for treatment in an anoxic environment, the housing 50 that surmounts the tank 10 and the passage of the shaft 200 through the tank are made completely airtight.

7. DESCRIPTION OF ONE EMBODIMENT OF A METHOD ACCORDING TO THE INVENTION

The system described here above has been used to treat water having a biological oxygen demand (BOD) of 540 mg/L. A water flowrate of 1 m³/h has been used in the system. This water flowrate corresponds to a retention time of water in the drum of about 2.5 hours. In this example, the rotation speed of the drum has been fixed at 3.6 rotations per minute, which makes it possible to convey about 31 m³ of air per hour into the water present in the drum, giving 6.3 m³ of air per hour and per cubic meter of the drum, corresponding to 0.019 m³ of air added per hour and per square meter of surface area of media.

The invention claimed is:

1. A system for biologically treating wastewater comprising:
    a tank comprising a point of entry for the wastewater to be treated and an exit point for treated wastewater;
    a shaft disposed in the tank;
    a rotating drum having a wall with one or more openings formed therein and supported on the shaft and configured to be partially submerged in the wastewater in the tank where less than one-half of the drum's internal volume contains the wastewater;
    a drive for rotatively driving the drum;
    media configured to support a biofilm disposed in the drum and retained in the drum as the drum is rotatively driven;
    the media occupying a volume of from 30% to 80% of the internal volume of the rotating drum;
    at least one hollow tube disposed in the rotating drum and secured to the wall of the rotating drum, the at least one hollow tube extending generally parallel to the shaft;
    the at least one hollow tube includes one or more orifices formed in a section of the tube; and
    wherein the drum and the at least one hollow tube are configured to alternatively fill the at least one hollow tube with air and wastewater in response to the drum being rotatively driven.
2. The system of claim 1 wherein the drum and at least one hollow tube are configured to fill the hollow tube with air during one portion of a revolution of the drum and to fill the at least one hollow tube with wastewater during another portion of the revolution of the drum.
3. The system of claim 1 characterized in that the media has a specific surface area greater than 200 m²/m³.
4. The system of claim 1 wherein the media has a specific surface area of 200 to 1300 m²/m³.
5. The system of claim 1 wherein the at least one hollow tube is at least four hollow tubes secured to the wall of the rotating drum.
6. The system of claim 1 wherein the tank encases the rotating drum and is generally airtight relative to ambient air outside of the tank.
7. The system of claim 1 wherein the media are made of plastic.
8. The system of claim 1 characterized in that the media are chosen from the group including pieces of pumice stone, expanded clay beads, sludge granulates, granular activated carbon, polystyrene beads, and pieces of cork.
9. A method of biologically treating wastewater comprising:
    directing the wastewater to be treated into a tank and into a rotating drum having a perforated wall and disposed in the tank;
    containing biofilm carriers in the rotating drum, the biofilm carriers occupying a volume of from 30% to 80% of the internal volume of the rotating drum;
    rotating the drum and contacting the biofilm carriers with the wastewater in the drum to biologically treat the wastewater therein;
    aerating the wastewater in the drum by employing a plurality of tubes having orifices therein and secured to the wall inside the drum;
    as the drum rotates, filling the tubes passing through an air space above a surface of the wastewater in the drum with air, and thereafter submerging the tubes containing the air in the wastewater in the drum causing the air in the tubes to pass into the wastewater in the drum and in the process filling the tubes with wastewater as the tubes move through the wastewater in the drum; and
    directing treated wastewater from the drum and out a treated wastewater outlet in the drum.
10. The method of claim 9 wherein the tubes are circumferentially spaced around the inside of the wall of the drum and at any one time one or more of the tubes passes through the air space while one or more other tubes are submerged in the wastewater in the drum and pass through the wastewater.
11. The method of claim 9 wherein the orifices formed in the tubes are oriented such that the orifices face the general direction of the rotation of the drum.
12. The method of claim 9 including maintaining the wastewater level in the drum such that less than half of the internal volume of the drum contains the wastewater.
13. The method of claim 9 wherein the wastewater within the rotating drum is also aerated due to the mixing of the biofilm carriers as the drum rotates.

* * * * *